US009065842B2

(12) United States Patent
Vandervort

(10) Patent No.: US 9,065,842 B2
(45) Date of Patent: Jun. 23, 2015

(54) METHODS AND SYSTEMS FOR AUTHENTICATING ELECTRONIC MESSAGES USING CLIENT-GENERATED ENCRYPTION KEYS

(75) Inventor: David Russell Vandervort, Walworth, NY (US)

(73) Assignee: XEROX CORPORATION, Norwalk, CT (US)

( * ) Notice: Subject to any disclaimer, the term of this patent is extended or adjusted under 35 U.S.C. 154(b) by 604 days.

(21) Appl. No.: 13/334,585

(22) Filed: Dec. 22, 2011

(65) Prior Publication Data

US 2013/0166914 A1     Jun. 27, 2013

(51) Int. Cl.
*H04L 9/32*     (2006.01)
*H04L 29/06*    (2006.01)

(52) U.S. Cl.
CPC ............. *H04L 63/123* (2013.01); *H04L 9/3281* (2013.01); *H04L 63/0428* (2013.01); *H04L 63/08* (2013.01); *H04L 9/3247* (2013.01)

(58) Field of Classification Search
CPC .... H04L 63/08; H04L 63/0428; H04L 9/3281
USPC .......................................... 713/176, 168, 170
See application file for complete search history.

(56) References Cited

U.S. PATENT DOCUMENTS

| 2006/0023672 | A1* | 2/2006  | Ahlers et al. ................... 370/338 |
| 2010/0122089 | A1* | 5/2010  | Godfrey et al. ............... 713/168 |
| 2011/0258446 | A1* | 10/2011 | Brown et al. .................. 713/168 |
| 2012/0066498 | A1* | 3/2012  | Engert ........................... 713/170 |
| 2012/0084376 | A1* | 4/2012  | Brown et al. .................. 709/206 |
| 2012/0096274 | A1* | 4/2012  | Campagna et al. ........... 713/176 |
| 2012/0124384 | A1* | 5/2012  | Livni et al. .................... 713/178 |

* cited by examiner

*Primary Examiner* — Aravind Moorthy
(74) *Attorney, Agent, or Firm* — MH2 Technology Law Group LLP

(57) ABSTRACT

Systems and methods for authenticating electronic messages using client-generated encryption keys provide for a sender transmitting an original message to a recipient device that includes a digital signature of the original message content and the key used to generate the digital signature. The sender may store an association between the digital signature, the key, and the recipient's address. The recipient may verify the integrity of the original message using the received digital signature and may further verify the authenticity of the message by transmitting a confirmation request message back to the sender that includes the original digital signature and a second digital signature of the confirmation request message using the received key. The sender may either confirm or deny that it sent the original message by determining whether a record exists that associates the digital signature and the key received from the recipient as well as the recipient's address.

23 Claims, 6 Drawing Sheets

METHODS AND SYSTEMS FOR AUTHENTICATING ELECTRONIC MESSAGES USING CLIENT-GENERATED ENCRYPTION KEYS

TECHNICAL FIELD

The present disclosure relates generally to methods, systems, and computer-readable media for authenticating electronic messages, such as electronic mail messages, using client-generated encryption keys.

BACKGROUND

Communication is at the heart of modern business and computer networks. Millions of dollars can be made or lost in a moment on the basis of the content of a single message. As a result, reliable and efficient techniques for ensuring the security of communications can be crucial to conducting effective business.

Two important aspects of trust in the area of network communications are end-point authentication ("authentication") and message integrity. Authentication refers to techniques for confirming that a message that purports to have been sent by a particular sender actually originated from that sender (e.g., not from a third-party impostor). For example, with respect to email communications, it is possible for a malicious third party to send an email to a recipient that falsely purports to originate from a different sender by specifying that sender's email address as the originating email address in a Simple Mail Transfer Protocol (SMTP) header, a technique sometimes referred to as "spoofing." Message integrity refers to mechanisms for determining that a message that was received by a recipient is the same message that was originally sent by the sender and was not, for example, tampered with by an intervening third party.

Conventional symmetric- and asymmetric-key encryption techniques can be used to provide for message authentication and integrity verification. However, these conventional techniques often impose significant computational, security, and administrative burdens on users and users' devices.

For example, in a public key infrastructure (PKI) system, which is a popular scheme for practicing asymmetric-key encryption, an entity can purchase a set of credentials, consisting of a matching public key and private key pair, from a trusted third party, such as a Certificate Authority. A certificate-holder sender may encrypt or digitally sign messages using its private key, which a recipient may decrypt or verify using the sender's corresponding public key, as attested to by the issuing Certificate Authority.

However, relying on PKI keys for message authentication and integrity verification can impose significant burdens on a certificate-holder. For example, in order to obtain PKI keys, senders must typically purchase PKI credentials from a Certificate Authority. The process of obtaining such credentials from a Certificate Authority may not only involve onerous requirements for proving a sender's identity and legality to the Certificate Authority, but may also come at significant financial expense to the sender.

Moreover, PKI-based authentication may be successful only insofar as a certificate-holder's private key is kept entirely secret and secure from all other parties. In the event that a private key is compromised, a certificate-holder may be subject to impersonation by a third-party impostor or other bad actor. Thus, it often becomes incumbent upon a certificate-holder to take a number of corrective actions in response to a private key being compromised, such as revoking the associated PKI certificate with the Certificate Authority, notifying recipients with whom the certificate-holder has communicated in the past using the PKI certificate, etc. Not only are such corrective actions burdensome, but they may also be delayed in their effectiveness in preventing unlawful impersonation with the appropriated private key, such that a malicious third party may continue to impersonate the certificate-holder for a period of time, even after the fraud is discovered.

PKI-based authentication can also impose a heavy technical and administrative burden on certificate-holders, especially when a sender needs to maintain multiple private keys, each of which may be associated with different communications, business divisions, recipients, levels of security, etc. While large enterprises, such as corporations and government agencies, may have infrastructures in place that are capable of handling such burdens and mitigating some of the above-described deficiencies of PKI-based authentication, smaller organizations and individual end-users often do not. As a result, smaller organizations and individual users frequently forgo the use of any kind of encryption, authentication, or message integrity security mechanisms for everyday communications, such as email, thus placing such entities at risk.

Accordingly, there is a need for communication security mechanisms that are robust enough to provide for effective and reliable end-point authentication and message integrity verification, yet are also light-weight and flexible enough to enable less sophisticated users to employ with little to no user involvement or administrative overhead.

SUMMARY

The present disclosure addresses these and other improvements in the area of communication security. In some embodiments, the present disclosure provides for a three-message protocol in which a sender may transmit an original message to a recipient device that includes a digital signature of the original message content and the key used to generate the digital signature. In connection with sending the original message, the sender may store a record of an association between the digital signature, the key, and the recipient's address.

The recipient may verify the integrity of the original message by confirming that the received digital signature matches the received content. The recipient may further verify the authenticity of the message by transmitting a confirmation request message back to the sender that includes the original digital signature and a second digital signature of the confirmation request message using the received key. Upon receiving the confirmation request message, the sender may either confirm or deny that it sent the original message by determining whether a record exists that associates the digital signature and the key received from the recipient as well as the recipient's address.

Additional objects, advantages, and embodiments of the present disclosure will be set forth in part in the description that follows, and in part will be derived from the description, or may be learned by practice of the disclosed embodiments. The objects, advantages, and embodiments of the present disclosure will be realized and attained by means of the elements and combinations particularly pointed out in the appended claims. It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
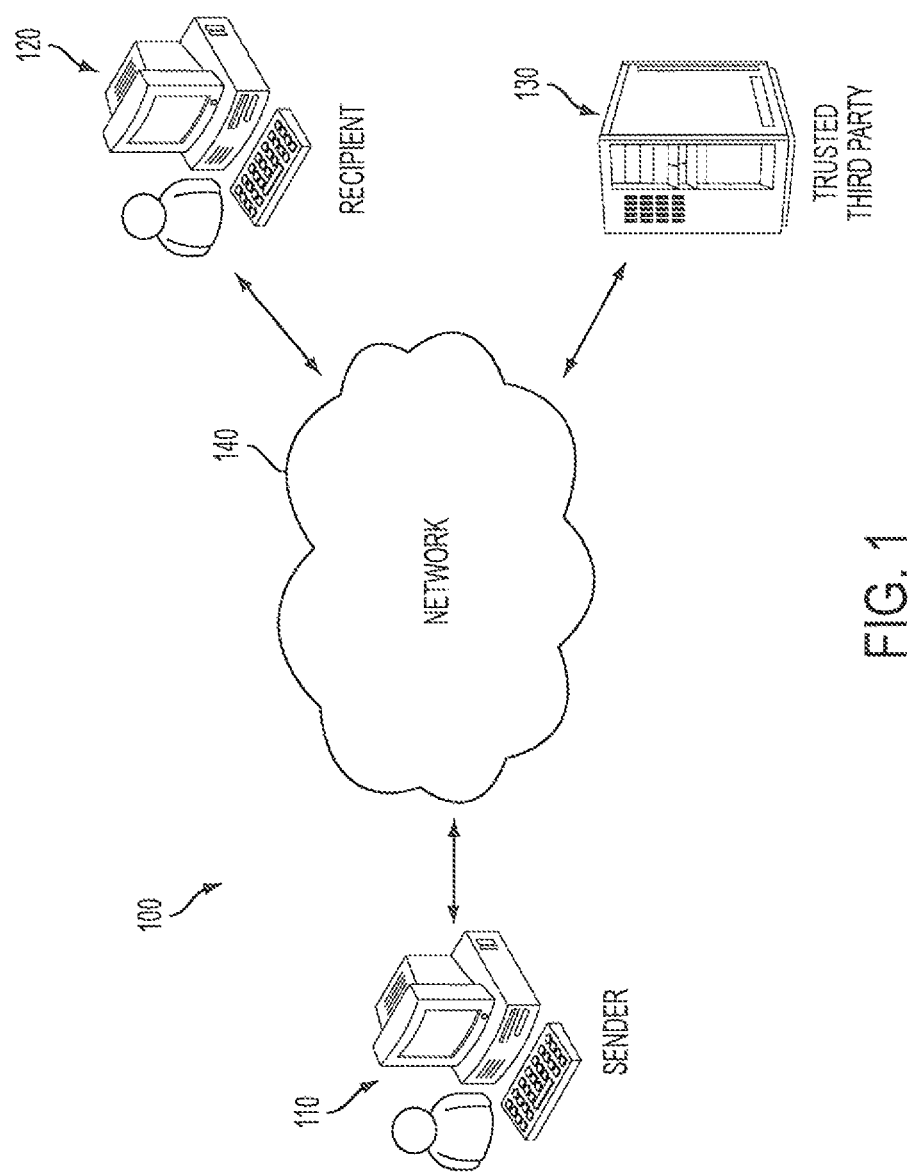
FIG. 1 is a diagram depicting an exemplary network configuration in which electronic messages may be communicated and authenticated between computing devices, consistent with certain disclosed embodiments.

The following detailed description refers to the accompanying drawings. Wherever convenient, the same reference numbers are used in the drawings and the following description to refer to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 is a diagram depicting an exemplary network configuration 100 in which electronic messages may be communicated and authenticated between computing devices, consistent with certain disclosed embodiments. As depicted in FIG. 1, a sender may use a computing device to send electronic communications to one or more recipients through a network 140, such as the Internet.

For ease of reference, both the sender, which may be a human operator, and the computing device through which the sender operates will be collectively referred to as "sender 110." In the following description, those skilled in the art will be able to appreciate, based on context, when the term is meant to refer to a human actor and when the term is meant to refer to a computing device. The same may be said for the term "recipient 120," which can be used to refer to a human recipient and/or a computing device through which the human recipient operates.

In some cases, a third party, such as a trusted third party 130, may also participate in network communications between sender 110 and recipient 120. Those skilled in the art will appreciate that the devices and arrangement thereof in network configuration 100 are exemplary only, and that other configurations may be used to implement embodiments of the present disclosure.

Figure 2:
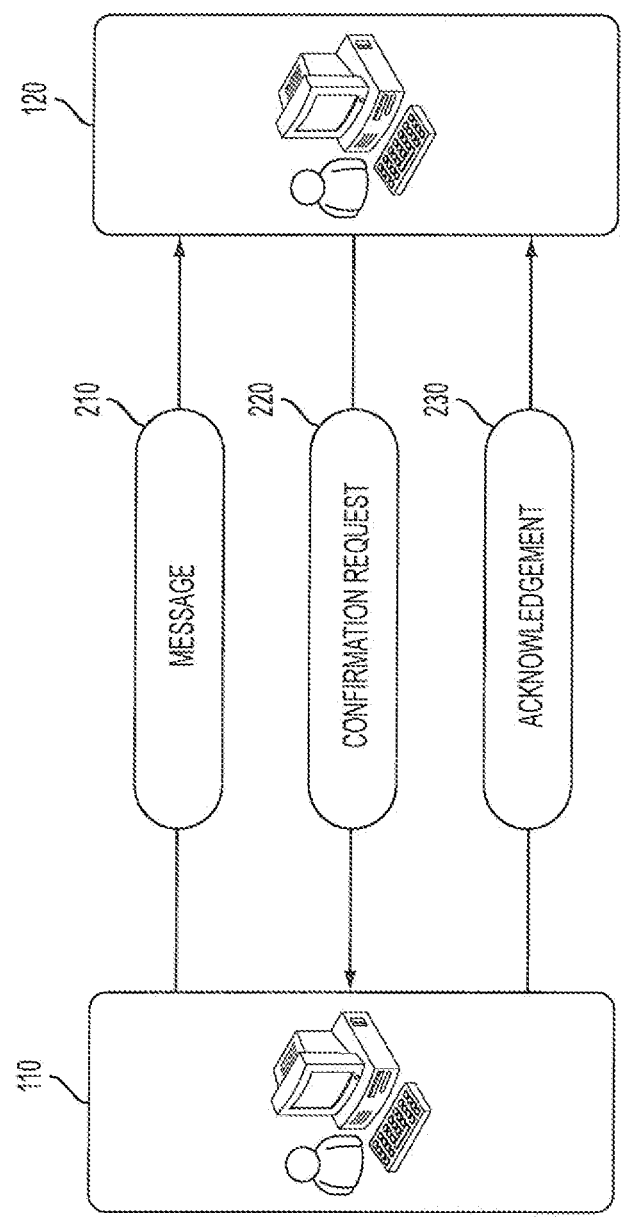
FIG. 2 is a flow diagram depicting an overview of an exemplary method for authenticating an electronic message, consistent with certain disclosed embodiments.

FIG. 2 is a flow diagram depicting an overview of an exemplary method of authenticating an electronic message, consistent with certain disclosed embodiments. As depicted in FIG. 2, in some embodiments, an electronic message may be authenticated using a three-message protocol. First, sender 110 may send an original message 210 to recipient 120. After recipient 120 receives the original message 210, recipient 120 may send a confirmation message 220 to sender 110 requesting confirmation that sender 110 sent the original message. Finally, in response to receive confirmation message 220, if sender 110 determines that it had sent the original message 210, then sender 110 may transmit an acknowledgment message 230 to recipient 120 acknowledging that sender 110 sent the original message 210. Thereafter, recipient 120 may regard the original message 210 as authenticated. Each message in this protocol, as well as their contents and functions, will now be further described in FIGS. 3-5.

Figure 3:
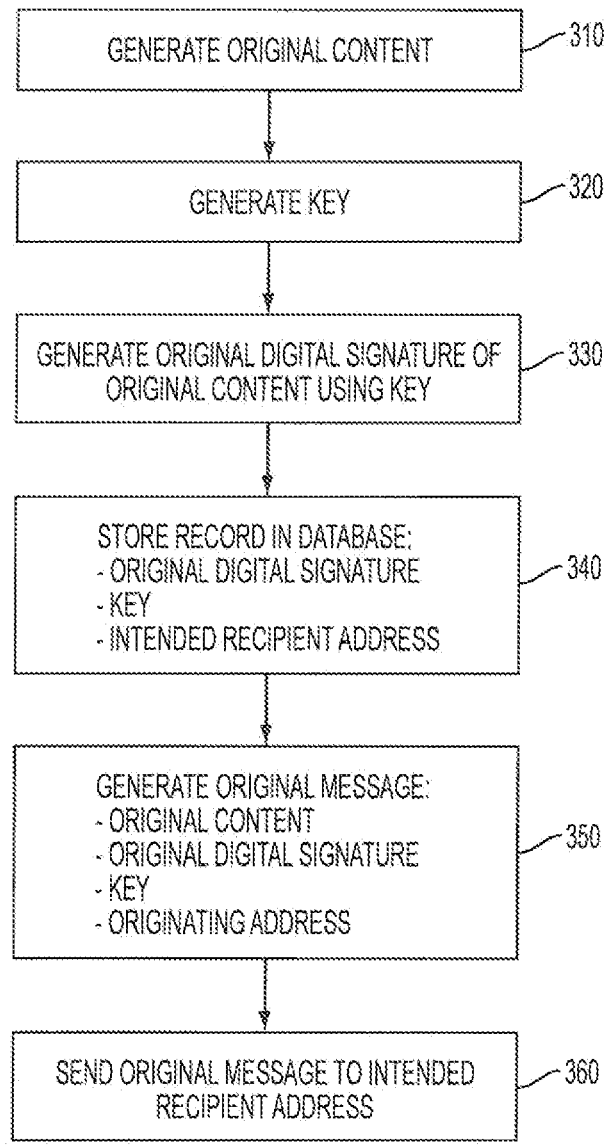
FIG. 3 is a flow diagram depicting an exemplary method of generating and sending an original electronic message capable of verification and acknowledgment by a message sender, consistent with certain disclosed embodiments.

FIG. 3 is a flow diagram depicting certain exemplary operations that may be performed by sender 110 as part of sending the original message 210. In step 310, sender 110 may generate original content. Original content can refer to any kind of content, information, or data that sender 110 may wish to impart to recipient 120. For example, the original content may be understandable by humans, such as an email message, a document, or an image, or may be understandable only to a computer, such as a set of program instructions, a network registration notification, or a routing request. Thus, the original content may be generated by a computing device, by a human operator, or by a combination of both.

In step 320, sender 110 may generate a key. A key may refer to a piece of information that can be used to encrypt or decrypt text or other data. A key may be either symmetric or asymmetric in nature. In a symmetric encryption scheme, data may be both encrypted and decrypted using the same key. By contrast, in an asymmetric encryption scheme, data that has been encrypted by a first key may not be decrypted using the same key, but must instead by decrypted using a second, different key that is related to the first key. In step 320, either a symmetric or an asymmetric key may be generated. However, as a running example, FIGS. 3-5 will assume the generation and use of a symmetric key.

In step 330, sender 110 may generate a digital signature of the original content (hereinafter, "original digital signature") using the key generated in step 320. For example, sender 110 may generate a digest of the original content using a hashing or other digest algorithm that is capable of mapping an arbitrarily-sized data set to a fixed-size data set in a deterministic manner. A digital signature may be generated by encrypting the digest using the generated key.

In step 340, sender 110 may store a record in a database (or one or more associated records) that relate the original digital signature to the key used to generate the digital signature and the address of a recipient for whom or for which the original content is intended to be sent. The intended recipient address may depend on the nature of communications or messages being communicated between sender 110 and recipient 120, or may depend on the role of the message within a program or technical implementation.

For example, in the context of email messages, the intended recipient address may simply be an email address to which an email containing the original content has been sent. In other embodiments, the intended recipient address may be an Internet Protocol (IP) address a media access control (MAC) address, etc. The intended recipient address may also be a flexible address, in that it may refer only to a public-facing or alias address of recipient 120 before translation, re-routing, or forwarding to an ultimate destination address obscured from outside persons or devices such as sender 110. Those skilled in the art will appreciate other ways in which an address may be loosely or flexibly associated with an intended recipient device or person.

By storing such a record in memory (e.g., in long-term memory that is capable of persisting across application sessions and device reboots), sender 110 may log the fact that a message has been sent (or will be sent, depending on the temporal relationship between step 340 and steps 350 and 360) that comprised the original content generated in step 310. Maintaining such a log of message records can enable sender 110 to determine whether it sent particular messages to particular recipients if confirmation from those recipients is subsequently requested, as will be further described below.

In step 350, sender 110 may generate a message (hereinafter, "original message") that includes the original content of step 310, the original digital signature of step 330, the key of step 320, and an originating address for the message. In some implementations, the originating address may be an address associated with sender 110, and may similarly relate to sender 110 as an alias, forwarding address, translation address, etc. In any event, the originating address may be identical to or derivable from an address from which the original message purports to originate, such that recipient 120 could confirm authenticity of the message by sending a confirmation request to that address, as further described below. Finally, in step 360, sender 110 may send the original message to sender 120 using the intended recipient address.

Figure 4:
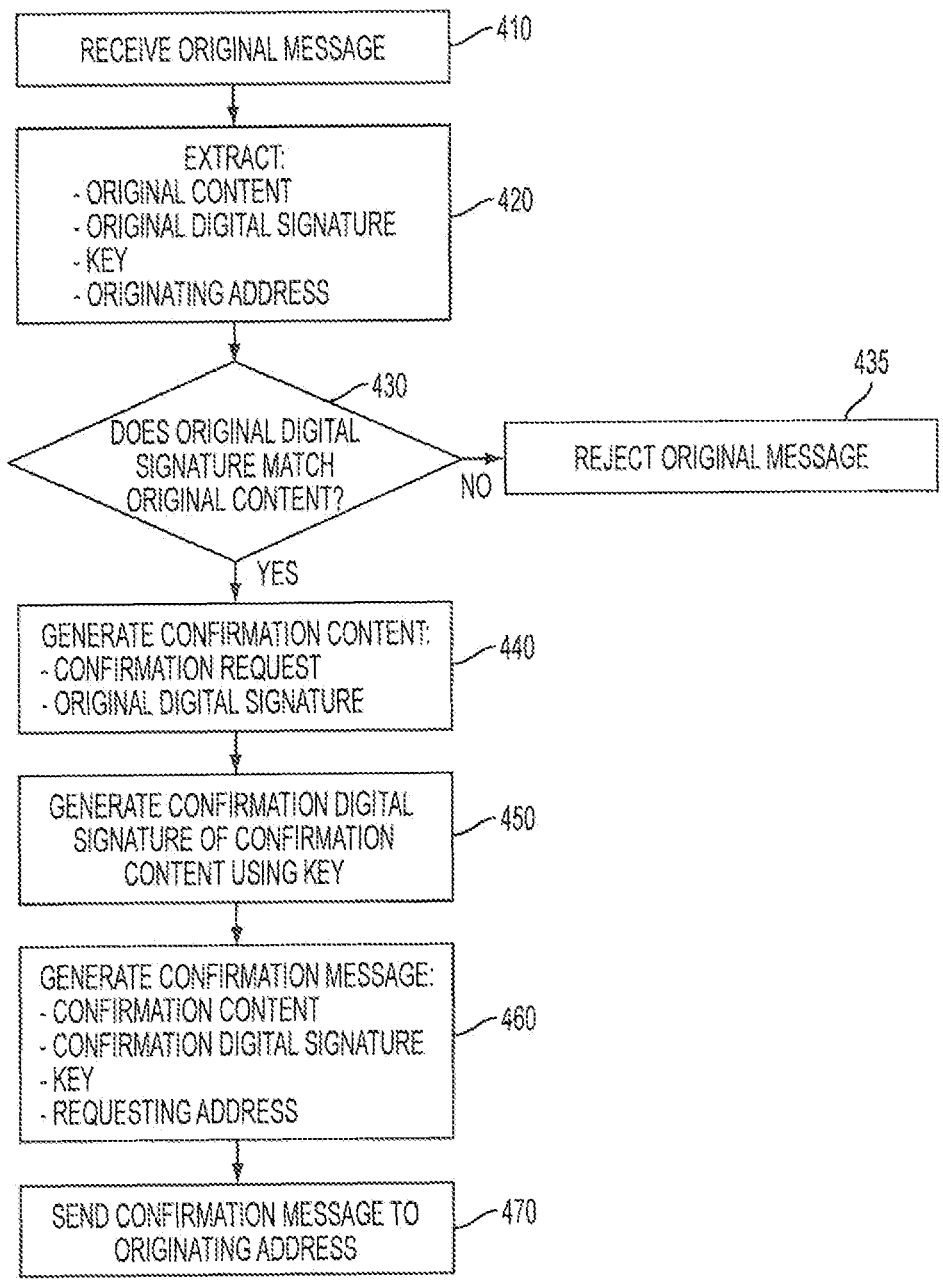
FIG. 4 is a flow diagram depicting an exemplary method of receiving, verifying, and requesting confirmation of an electronic message by a message recipient, consistent with certain disclosed embodiments.

FIG. 4 is a flow diagram depicting an exemplary method of receiving, verifying, and requesting confirmation of an electronic message by a message recipient, consistent with certain disclosed embodiments. In step 410, recipient 120 may receive the original message transmitted by sender 110 in step 360. In step 420, recipient 120 may extract the information necessary to confirm the authenticity and integrity of the message. Thus, recipient 120 may extract from the original message the original content, the original digital signature, the key, and the originating address.

In step 430, recipient 120 may verify message integrity by determining whether the original digital signature matches the original content. For example, recipient 120 may attempt to duplicate the steps performed by sender 110 in generating the original digital signature by generating a digest of the original content and encrypting the digest with the received key. In some embodiments, it may be necessary for sender 110 to specify the digest algorithm used to generate the digest—e.g., as part of the original message transmitted to recipient 120. In other embodiments, the digest algorithm may be known in advance by recipient 120.

Recipient 120 may determine whether the received digital signature matches the original content by determining whether the digital signature that recipient 120 generated using the original content and the received key match the received digital signature. If the original digital signature does not match the original content (step 430, No), then various reasons may exist for the mismatch.

For example, it may be the case that the content originally generated by sender 110 was modified after being transmitted by sender 110 but before being received by recipient 120. That modification may have been inadvertent or caused by technical failure, as in the case of transmission or replication errors along the communication path between sender 110 and recipient 120. Or, a malicious third party may have intercepted the message transmitted by sender 110 and modified the content of the message before transmitting the modified message to recipient 120. Or, as yet another possibility, the digital signature itself may have been modified between transmission and receipt, either by inadvertent or malicious means.

Thus, as used in FIG. 4, the terms "original content," "original digital signature," and "original message" may not be identical to the original content, digital signature, and message generated in steps 310, 330, and 350, respectively, when a mismatch is detected. Rather, with respect to recipient 120, such terms may refer to the putative or expected originality of the items as generated and transmitted by sender 110.

In any event, when the received digital signature does not match the received content, recipient 120 may reject the received message (step 435). Rejecting the received message may involve different operations depending on the nature of the applications running on recipient computing device 120 or the nature of the communication protocol in which the present disclosure is practiced.

For example, in the case of email, one or more operations depicted in FIG. 4 may be performed by an email client application running on recipient computing device 120. The email client may be responsible for retrieving email messages from a mail server, such as an SMTP server, using Internet message access protocol (IMAP) or post office protocol (POP), and examining those email messages for authenticity and message integrity before placing them into a message inbox available to a human operator ("user").

In some embodiments, if the email client determines that the received message lacks integrity, the email client may flag the message as suspicious or place the message in a spam or quarantine folder. In other embodiments, the email client may reject the message entirely, may decline to notify the user about the message, and/or may transmit a rejection message to the originating address of the original message, the IP address from which the original message came, the originating SMTP server, etc. Those skilled in the art will appreciate that additional or different operations may be performed by recipient 120 in response to determining that the original digital signature does not match the original content.

If the received original signature does match the received original content (step 430, Yes), then recipient 120 may next proceed to determine whether the received message can be authenticated. As depicted in FIG. 2, in some embodiments, the authentication process may be premised on confirming with the putative originator of the received message that that entity in fact transmitted the message using one or more confirmation requests 220.

Such a confirmation request may be constructed or used in a number of different ways. However, in some embodiments, one important aspect of the confirmation request may be its ability to present the entirety of the message received from the putative sender for confirmation. One approach to accomplishing this purpose may be to transmit the entirety of the message received by recipient 120 back to the putative sender for confirmation. However, using this approach, potentially large messages would need to be transmitted back to the sender and verified by the sender character-by-character or, in some cases, bit-by-bit in order to confirm complete message authenticity.

Because this approach may be impractical for large messages, an alternative approach may be for sender 120 to use the received digital signature itself when requesting confirmation from the sender. In particular, provided that a robust and deterministic hashing algorithm was used by the sender to generate the original digital signature, the original digital signature is capable of representing each and every bit or character of the original message in potentially significantly abbreviated form, since the changing of even a single bit or character in the content that is hashed would result in a different digest and/or digital signature.

At the same time, it may be desirable to ensure message integrity for any confirmation request from recipient 120 as well. In some embodiments, recipient 120 may provide for message integrity of its confirmation request by generating a digital signature of the confirmation request itself using the key received from sender 110.

For example, in step 440, recipient 120 may generate confirmation content that includes a confirmation request and the received original digital signature. The confirmation request may be simple in nature and may correspond to human semantics, such as "Please confirm receipt of the following message:", or may be a simple character or bit sequence that would be recognized by sender 110 as requesting confirmation of a following digital signature.

In step 450, recipient 120 may generate a confirmation digital signature by encrypting the confirmation content of step 440 using the received key. In some cases, it may not be necessary to include the confirmation request itself within the content from which the confirmation digital signature is generated. Rather, it may be necessary to simply ensure that the original digital signature is modified by at least one bit or character (e.g., an additional character) so that the encryption of the original digital signature using the received key results in a new digital signature by virtue of content or modifications inserted by recipient 120.

Next, in step 460, recipient 120 may generate a confirmation message that includes the confirmation content of step 440, the confirmation digital signature of step 450, the received key, and the address at which recipient 120 received the original message of step 410 ("requesting address"). In step 470, recipient 120 may then send the confirmation message to the originating address—i.e., the address indicated in the original message as the purported origin of the message received in step 410. In some implementations, the originating address may not be a part of the original message or message content itself, but may instead be part of preliminary or ancillary communications related to receiving the original message.

Figure 5:
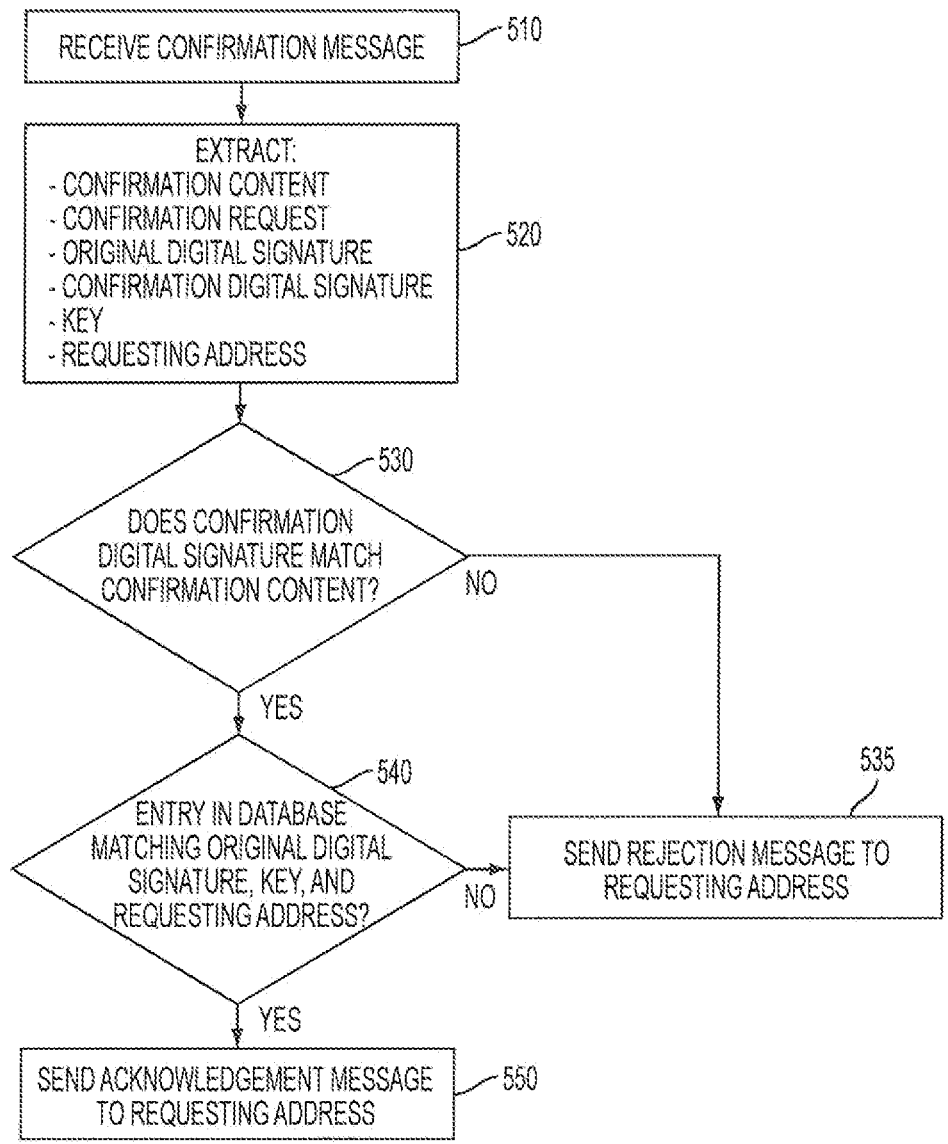
FIG. 5 is diagram depicting an exemplary method of receiving a confirmation message, verifying the confirmation message, and sending an acknowledgment message by a message sender, consistent with certain disclosed embodiments.

FIG. 5 is diagram depicting an exemplary method of receiving a confirmation message, verifying the confirmation message, and sending an acknowledgment message by a message sender, consistent with certain disclosed embodiments. In step 510, sender 110 may receive the confirmation message transmitted by recipient 120 in step 470. In step 520, sender 110 may extract the information necessary to determine whether it had previously sent the message for which recipient 110 is requesting confirmation. Thus, sender 110 may extract from the confirmation message the confirmation content, the confirmation request, the original digital signature, the confirmation digital signature, the key, and requesting address.

In step 530, sender 110 may verify message integrity by determining whether the confirmation digital signature matches the confirmation content. For example, sender 110 may attempt to duplicate the steps performed by recipient 120 in generating the confirmation signature by generating a digest of the confirmation content and encrypting the digest with the received key. In some embodiments, it may be necessary for recipient 120 to specify the digest algorithm used to generate the digest—e.g., as part of the confirmation message transmitted to sender 110. In other embodiments, the digest algorithm may be known in advance by sender 110 on account of being identical to a digest algorithm previously used by sender 110 to create the original message.

Sender 110 may determine whether the received digital signature matches the confirmation content by determining whether the digital signature that sender 110 generated using the confirmation content and the received key match the received digital signature. If the confirmation digital signature does not match the confirmation content (step 530, No), then, similar to that described with respect to FIG. 4, various reasons may exist for the mismatch, including inadvertent or malicious modification.

Thus, as used in FIG. 5, the terms "confirmation content," "confirmation digital signature," and "confirmation request" may not be identical to the confirmation content, confirmation digital signature, and confirmation request generated in steps 440 and 450 when a mismatch is detected. Rather, with respect to sender 110, such terms may refer to the putative or expected nature of confirmation information received by sender 110.

In any event, when the received digital signature does not match the received content, sender 110 may send a rejection message to the requesting address (step 535). The rejection message may inform the custodian of the requesting address (which may be assumed to have sent the confirmation message) that the confirmation message lacks integrity and that, as a result, sender 110 cannot confirm that it sent any message that is the subject of the confirmation message. In other embodiments, a different kind of message could be sent to the requesting address to inform the sender of the confirmation message about the lack of message integrity, or the confirmation message could simply be disregarded by sender 110.

If the received confirmation digital signature does match the received confirmation content (step 530, Yes), then sender 110 may next proceed to determine whether it sent the message that is the subject of the confirmation message. As a preliminary step, sender 110 may first extract the original digital signature from the confirmation content.

Next, in step 540, sender 110 may search a database—e.g., the database of step 340—to determine whether there is an entry in the database (or a set of related entries) that matches the combination of the original digital signature, the key, and the requesting address. That is, sender 110 may determine whether the database contains one or more records indicating that an original message that matches both the original digital signature and the key that was previously sent to the requesting address.

In some embodiments, it may not be necessary for the database to store the actual content of the original message (for which confirmation is being requested). Rather, provided that a deterministic hashing algorithm is used (as in step 330) to generate and store a digital signature for any message that is sent, sender 110 should be able to determine whether a particular message has been sent simply by consulting a database of digital signatures, even if the content of the original message is unknown. Moreover, by storing the intended recipient address and the key that was used to generate the digital signature in association with the digital signature in memory, sender 110 can determine not only whether a particular original message was sent, but also whether that message was sent to a particular recipient and whether the digital signature was generated using a particular key.

If the database associated with sender 110 does not record an association between the original digital signature, the key, and the requesting address extracted or derived from the received confirmation content (step 540, No), then sender 110 may determine that it did not send the message for which the confirmation message sender is requesting confirmation. And various reasons may exist for the lack of such records in the database, as further discussed below. Sender 110 may therefore send a rejection message to the requesting address denying that it sent the message for which confirmation has been requested (step 535). In some cases, such a rejection message may differ from the kind of message that would be sent if message integrity were found deficient; in other cases, the message may be the same.

If, however, there is an association between the original digital signature, the key, and the requesting address extracted or derived from the received confirmation content (step 540, Yes), then sender 110 may determine that it did send the message for which the confirmation message sender is requesting confirmation. Thus, in step 550, sender 110 may send an acknowledgement message to the requesting address to acknowledge that it did send the message. In some embodiments, once an acknowledgement is sent, sender 110 may cause the database to reflect that an acknowledgment has been sent for the signature-key-address combination, which may also indicate that the message was safely received by the intended recipient. In some embodiments, message records so flagged may be deleted after a specified time (e.g., 24 hours) or may instead be deleted after acknowledgment is sent.

If sender 110 receives a confirmation request for which it is unable to determine that it sent a corresponding message, then a number of explanations could exist for the discrepancy. For example, it could be the case that a third-party impostor had sent a message to recipient 120 purporting to be from sender 110 (e.g., by including sender 110's address as the originating address). In this example, recipient 120 might receive the original message from the impostor, along with a digital signature of the original content and a key used to create the digital signature. Provided that the digital signature, the content, and the key all match, recipient 120 may have no reason to suspect the message after determining that it has integrity.

However, in step 470, recipient 120 would send a confirmation message not to the impostor, but to sender 110 by using the originating address as the destination address of the confirmation message. Once sender 110 receives the confirmation message, sender 110 may determine that it did not send the message that was spoofed by the impostor because sender 110's database lacks an association between the digital signature, the key, and recipient 120's address. Hence, provided that the impostor is unable to intercept confirmation messages 220 transmitted to sender 110, the impostor will be unable to impersonate sender 110, because recipient 120 will seek confirmation from the impersonated originating address, not from the impostor's originating address.

Moreover, even if the impostor is able to intercept an original message from sender 110 to recipient 120, provided that the impostor is not able to likewise intercept communications from recipient 120 to sender 110 as part of a "man-in-the-middle" attack, the impostor should not be able to successfully impersonate sender 110. For example, sender 110 may transmit an original message 210 that is intended for recipient 120. However, prior to reaching recipient 120, an impostor may intercept and modify the message. Depending on the impostor's method of modification, the impersonation may be exposed in different ways.

If the impostor modifies only the content of the original message, while leaving the original digital signature and the key intact, then recipient 120 will be able to determine that it did not receive a proper message by determining that the original digital signature that originated from sender 110 does not match the modified content that originated from the impostor. If the impostor both modifies the content and generates a new digital signature by encrypting the modified content with a new key, then recipient 120 may not be able to detect the deception, but sender 110 will be able to deny that it sent the message received by recipient 120. In particular, sender 110 will be able to determine that it has no database entry matching any of the modified content or the impostor's key or digital signature.

If the impostor modifies the content but generates a new digital signature using sender 110's original key, then sender may further determine that a malicious activity has occurred. Sender 110 will be able to recognize the key that it receives back from recipient 120 in the confirmation message 220. However, when sender 110 determines that a different digital signature was created using that key than the digital signature that was associated with the key in the database, sender 110 can conclude that a third party has attempted to impersonate it using one of its keys.

Thus, as can be seen, the present disclosure is able to provide for reliable authentication even if a malicious third party comes into possession of sender 110's key. This characteristic of the present disclosure, thus, presents an improvement over conventional symmetric- and asymmetric-key authentication mechanisms, which may be compromised if an attacker obtains access to a sender's key. By contrast, in the present disclosure, primary digital signature keys may not only be loosely held by a sender, but may even be transmitted as part of non-secure communications themselves, a practice not done in conventional symmetric- and asymmetric-key authentication mechanisms.

Moreover, unlike conventional asymmetric-key authentication, in the present disclosure, a sender may generate primary digital signature keys on its own, without the need for a trusted third party to generate and issue such keys. For example, whereas in conventional asymmetric-key authentication, a sender may digitally sign a communication by requesting a public-private key pair from a trusted third party, such as a Certificate Authority, often at significant expense and time delay, in the present disclosure, a sender may digitally sign a communication by simply generating a new random key on its own.

Whereas in conventional asymmetric-key authentication, a sender may digitally sign multiple communications by maintaining complete privacy and security over a single private key and digitally signing all communications using that same private key, in the present disclosure, a sender may simply generate a new key for each message without regard for maintaining the secrecy of the key. Whereas in conventional asymmetric-key authentication, if a private key compromised, it may take a matter of hours or days to revoke the key (during which time an impostor may successfully impersonate the sender), in the present disclosure, a sender can have immediate control over the validity of a key or messages digitally signed therewith by simply rejecting any confirmation requests that surround use of that key.

Returning to the actions of recipient 120, depending on sender 110's response to the confirmation message 220, recipient 120 may take different actions. For example, if sender 110 sends a message 230 rejecting the confirmation request, then, similar to the possible operations described with respect to step 435, recipient device 120 may flag the message as suspicious, place the message in a quarantine folder, reject the message by declining to notify the user about the message, forward the original message to one or more parties for reporting purposes, etc. Similarly, if recipient 120 sends a confirmation message 220 but does not receive any kind of response 230 from sender 110 after a specified period of time (e.g., 24 hours), then recipient 120 may regard the message as unauthenticated and may take one or more of the foregoing actions, just as if a rejection message had been received.

In some embodiments, sender 110 may also place a time limit on confirming messages that it sent. For example, in connection with sending a message, sender 110 may store one or more records in its database reflecting the sending of the message, as described above. Sender 110 may also flag the message record(s) for deletion after a specified period of time (e.g., 24 hours) if a confirmation message 220 is not received from the intended recipient. As a result, if the intended recipient requests confirmation of the original message after the specified period of time, sender 110 will not be able to locate a record in its database reflecting the sending of the message, and will therefore send a rejection message in response to the request for confirmation. In other embodiments, sender 110 may simply flag the record(s) after the specified period of time has passed.

The above-described embodiments may be modified in order to practice the present disclosure in other ways. For example, in some embodiments, a key may not be used at all. Rather, sender 110 may simply send an unencrypted digest of the original message to recipient 120 (along with the original message) rather than a digital signature. Provided that sender 110 stores an association between the digest and the intended recipient address in memory, sender 110 would be able to confirm or deny that it had sent a particular message to a particular recipient in response to a confirmation request. However, in some embodiments, it may provide additional utility to use a key in a manner described above, as the key may allow recipient 120 to perform certain validity checks, such as a message integrity and presumed authentication, without relying entirely on communicating back with sender 110 as part of the confirmation request and acknowledgment response protocol.

The present disclosure may be used to provide message integrity and end-point authentication mechanisms for any kind of communication or technology in which it may be useful. For example, as described above, the present disclosure may be used as a security mechanism for email communications. When used for email communications, one or more of the described operations may be performed by an email application running on one or both of sender 110 and recipient 120 devices. Such functionality could be included as native functionality within the application, or could be added to the application as part of a plug-in or add-on component. Alternatively, one or more operations could be performed by the email servers (e.g., SMTP or Microsoft Exchange® servers) that host sender 110's and recipient 120's email accounts.

By providing such functionality within the email application itself or within the email server, the above-described techniques for improving the security of email communications may be easily added to a sender's or a recipient's email technology without the need to involve third parties or even agree on a security mechanism between senders and recipients. For example, an individual user may instruct his or her email application or email server to subject incoming emails to one or more of the security mechanisms described above. In response to receiving an incoming message 210, the email application or email server may send a confirmation message 220 to the putative sender, and may wait for a response.

The confirmation message 220 may be transmitted to the sender using a specified port number that differs from the port numbers with which original messages 210 are transmitted and/or received. If the sender's email application or email server is also configured to provide security mechanisms consistent with the above-described embodiments, then the sender's device may recognize and respond to the confirmation message 220 sent to the specified port, and may respond with an acknowledgement or rejection message 230.

If, however, the sender's device does not provide or recognize such a security protocol, then the sender's device may simply ignore the incoming confirmation message. After an acknowledgement message 230 is not received from the sender within a specified time, the recipient device may regard the message as unauthenticated or may infer that the sender device is not enabled to perform such email confirmation. The recipient device may therefore still provide the user with the received original message, but may indicate to the user that the message has not been authenticated.

Similar techniques may be applied in the case of the sender having such security mechanisms enabled while the recipient does not. For example, the sender may place the digital signature and the key within SMTP headers or hidden fields within the message body so that recipient devices may ignore such data when it is not recognized. Thus, the present disclosure may be implemented in a light-weight manner on individual sender or recipient devices in a device-by-device manner without the need to require other parties or devices to also install any additional software.

The email application may generate all necessary keys, store all necessary associations, and perform all necessary verification and confirmation operations in the background in a manner that does not require any knowledge, administration, or interaction with the user other than the simple on/off enabling of the security feature in an email application graphical user interface. These attributes of the present disclosure allow it to be used by any user or organization, regardless of the organization's size or the user's technical sophistication, due to its light-weight and plug-and-play nature. Thus, users can introduce security into their communications without the need to invest in the hassles that surround conventional PKI-based security.

In some embodiments, one or more operations described above could be performed by a trusted third party 130. For example, sender 110 could send a normal email (i.e., without digital signature and key) to trusted third party 130 that is addressed to recipient 120. Trusted third party 130 could then take responsibility for generating a key and a digital signature associated with the email, and forwarding all three data items to recipient 120. Recipient 120 could then send a confirmation message 220 to trusted third party 130, instead of sender 110, and trusted third party 130 could perform the above-described operations of verifying the digital signature, key, and intended recipient address and sending an acknowledgement or rejection to recipient 120. In other embodiments, a recipient 120 may rely on the trusted third party 130 to perform verification operations. In still other embodiments, both sender 110 and recipient 120 may rely on trusted third party 130 to ensure authentic communications between them using one or more of the disclosed embodiments.

Moreover, even though the above-described embodiments may be used as a substitute for conventional asymmetric-key authentication, in some embodiments, the present disclosure may also make use of conventional asymmetric- or symmetric-key authentication to add further security elements. For example, in some embodiments, sender 110 may digitally sign an original message 210 using a private PKI key that has been issued by a trusted third-party Certificate Authority, and may send its corresponding public key as part of the original message 210. In this manner, a recipient 120 that receives the public key as part of an original message 210, may confirm that the public key belongs to the putative sender by verifying the same with the Certificate Authority (e.g., a public certificate associated with the public key may have been digitally signed by the Certificate Authority). Thus, an impostor would be unable to impersonate sender 110 by merely modifying the original content and digitally signing the modified content using its own key.

Moreover, whereas in conventional asymmetric-key authentication an impostor may successfully impersonate a sender if the impostor obtains access to the sender private key, such a deficiency can be cured using one or more of the above-described techniques. For example, even if an impostor sends a spoofed email to recipient 120 that purports to be from sender 110 by digitally signing the email using sender 110's private key, once sender 110 receives the confirmation message 220, sender 110 will be able to determine that it has no record of sending the spoofed email using the compromised private key. Thus, the sender 110 will be able to repudiate having sent the spoofed message, and the impostor will be thwarted despite having obtained access to sender 110's private key.

Symmetric and asymmetric encryption may be used in other ways to further attest to message integrity and sender authentication. For example, in some embodiments, rather than encrypting a message digest using sender 110's private key and including the corresponding public key in the original message 210, sender 110 may generate or digitally sign a different key using its private key, or may use its private key in another way to attest to the message, such as using it in part to generate the digital signature. In this manner, sender 110 may continue to generate and send keys with messages, as described above, but such keys may be derived from or associated with a duly issued private key from a Certificate Authority. In still other embodiments, the content of messages transmitted between sender 110 and recipient 120 may be encrypted using asymmetric or symmetric keys.

Moreover, the present disclosure is not limited to human-readable messages between devices. In some embodiments, the above-described embodiments could be modified to introduce a secure element to hypertext transfer protocol (HTTP) or JavaScript communications with respect to the World-Wide Web. For example, as replacement mechanism for the use of conventional secure sockets layer (SSL) to implement secure HTTP (HTTPS), a web server could digitally sign any HTTP responses 210 (e.g., using a dynamically generated key). A client browser application could then verify the authenticity of any such HTTP responses by sending a confirmation message 220, which the server could acknowledge or reject using techniques similar to those described above.

The present disclosure is also not limited to only the application layer of the Open Systems Interconnection (OSI) network model, but may be used in any layer, or even outside of the OSI model itself. For example, with respect to the network and/or data link layers, the above-described techniques could be used to enable routers or link-layer switches to communicate networking information with each other. For example, in the Border Gateway Protocol (BGP), it is often necessary for routers to transmit messages to inform other routers of changes to a network configuration, thus allowing recipient routers to modify their forwarding tables. Typically, it is not necessary that such communications be encrypted, but it may be necessary to ensure that updated forwarding information from a putative source in fact originated from that source. Otherwise, a malicious actor may instruct various routers to reconfigure their forwarding tables in a manner that allows the actor to intercept messages that were not intended for it.

However, using one or more of the above-described techniques, a router that is the recipient of an instruction to update its forwarding tables may verify that it received the instruction from the alleged sender of the instruction or from an authorized sender. Similar techniques may be used for communications between two or more domain name service (DNS) servers to ensure that instructed updates to IP address-domain name mappings were received from authorized sources.

Figure 6:
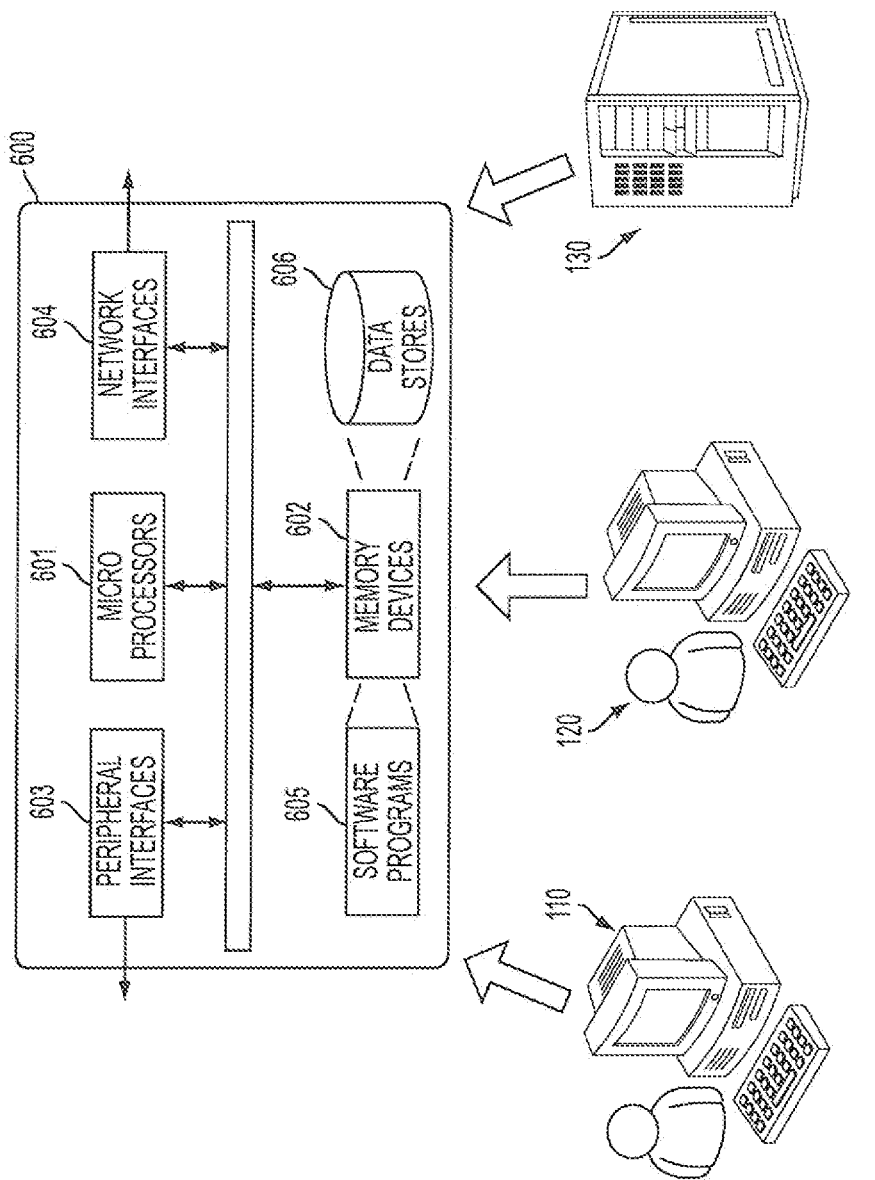
FIG. 6 is a diagram depicting an exemplary hardware configuration that may be used to practice one or more of the disclosed embodiments.

FIG. 6 is a diagram depicting an exemplary hardware configuration 600 that may be used for any of sender 110, recipient 120, or trusted third party 130. Hardware configuration 600 may comprise one or more microprocessors 601 of varying core configurations and clock frequencies; one or more memory devices or computer-readable media 602 of varying physical dimensions and storage capacities, such as flash drives, hard drives, random access memory, etc., for storing data, such as images, files, and program instructions for execution by one or more microprocessors 601; one or more network interfaces 604, such as Ethernet adapters, wireless transceivers, or serial network components, for communicating over wired or wireless media using protocols, such as Ethernet, wireless Ethernet, GSM, WiMAX, etc.; and one or more peripheral interfaces 603, such as keyboards, mice, touchpads, computer screens, touchscreens, etc., for enabling human interaction with and manipulation of any of devices 110, 120, or 130. In some embodiments, the components of hardware configuration 600 need not be enclosed within a single enclosure or even located in close proximity to one another.

Memory devices 602 may further be physically or logically arranged or configured to provide for or store one or more data stores 606, such as one or more file systems or databases, and one or more software programs 605, which may contain interpretable or executable instructions for performing one or more of the disclosed embodiments. Those skilled in the art will appreciate that the above-described componentry is exemplary only, as devices 110, 120, or 130 may comprise any type of hardware componentry, including any necessary accompanying firmware or software, for performing the disclosed embodiments. Any of devices 110, 120, or 130 may also be implemented in part or in whole by electronic circuit components or processors, such as application-specific integrated circuits (ASICs) or field-programmable gate arrays (FPGAs).

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments. Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described embodiments, but instead is defined by the appended claims in light of their full scope of equivalents.

What is claimed is:

1. A computer-implemented method of authenticating an electronic message by a sender of the electronic message, the method comprising:
   sending, by the sender, a first message to a recipient address associated with a recipient, wherein the first message comprises first content;
   storing a record of association between the first content and the recipient address in memory;
   receiving, by the sender, a second message from the recipient in response to the first message, wherein the second message comprises a request for confirmation that the sender sent the first content to the recipient; and in response to the request for confirmation:

determining, by the sender, that the sender has the record of association between the first content and the recipient address;

confirming, by the sender without third-party authentication, that the sender sent the first content to the recipient; and sending, by the sender, a third message to the recipient address, wherein the third message communicates an acknowledgement confirming that the sender sent the first content to the recipient address.

2. The method of claim 1, wherein the first message comprises a cryptographic key and a first digital signature of the first content that was generated using the cryptographic key, and wherein sending the first message further comprises:

sending the first message to the recipient address via a non-secure communication.

3. The method of claim 1, wherein the first message comprises a digest of the first content, and wherein the record of association comprises:

the recipient address; and
the digest of the first content.

4. The method of claim 1, further comprising:

generating, by the sender, a cryptographic key, wherein the first message comprises a first digital signature of the first content that was generated using the cryptographic key.

5. The method of claim 4, wherein the first message further comprises the cryptographic key.

6. The method of claim 5, wherein the record of association further associates the first content and the recipient address with the first digital signature and the cryptographic key.

7. The method of claim 6, wherein the second message from the recipient further comprises the first digital signature.

8. The method of claim 7, wherein the second message from the recipient further comprises:

second content generated by the recipient;
a second digital signature of the second content that was generated by the recipient using the cryptographic key; and
the cryptographic key.

9. The method of claim 8, wherein the second content generated by the recipient further comprises:

the first digital signature; and
the request for confirmation that the sender sent the first content to the recipient.

10. The method of claim 8, further comprising:

verifying integrity of the second content using the cryptographic key.

11. A computer-implemented method for performing sender-authentication of an electronic message received by a recipient, the method comprising:

receiving, by the recipient, a first message at a recipient address associated with the recipient, wherein the first message comprises first content and a putative sender address from which the first message purportedly originated;

sending, by the recipient, a second message directly to the putative sender address in response to the first message, wherein the second message comprises:

information reflecting the first content; and
a request for confirmation that a sender associated with the putative sender address sent the first content to the recipient; and determining, by the recipient without third-party authentication, whether the first message is authentic based on whether a third message is received directly from the putative sender address acknowledging or repudiating that the sender sent the first content to the recipient.

12. The method of claim 11, wherein:

the first message comprises a digest of the first content; and
the information reflecting the first content in the second message comprises the digest of the first content.

13. The method of claim 11, wherein the first message comprises a first digital signature of the first content that was generated using a sender-generated cryptographic key.

14. The method of claim 13, wherein the first message further comprises the cryptographic key.

15. The method of claim 14, wherein receiving the first message further comprises:

receiving the first message comprising the cryptographic key via a non-secure communication.

16. The method of claim 14, wherein the information reflecting the first content in the second message comprises the first digital signature.

17. The method of claim 16, wherein the second message further comprises:

second content generated by the recipient;
a second digital signature of the second content that was generated by the recipient using the cryptographic key; and
the cryptographic key.

18. The method of claim 17, wherein the second content comprises:

the first digital signature; and
the request for confirmation that the sender sent the first content to the recipient.

19. The method of claim 11, wherein determining whether the first message is authentic comprises:

receiving a third message from the putative sender address acknowledging that the sender sent the first content to the recipient; and
deeming the first message authentic based on receiving the third message.

20. The method of claim 11, wherein determining whether the first message is authentic comprises:

receiving a third message from the putative sender address repudiating that the sender sent the first content to the recipient; and
deeming the first message non-authentic based on receiving the third message.

21. The method of claim 11, wherein determining whether the first message is authentic comprises:

deeming the first message non-authentic based on receiving no response from the putative sender address in response to the second message within a specified period of time.

22. A system for authenticating an electronic message by a sender of the electronic message, the system comprising:

a processing system comprising one or more processors; and
a memory system comprising one or more computer-readable media, wherein the one or more computer-readable media contain instructions stored thereon that, if executed by the processing system, cause the system to perform operations comprising:

sending, by the sender, a first message to a recipient address associated with a recipient, wherein the first message comprises first content;
storing a record of association between the first content and the recipient address in the memory system;

receiving, by the sender, a second message from the recipient in response to the first message, wherein the second message comprises a request for confirmation that the sender sent the first content to the recipient; and in response to the request for confirmation:
determining, by the sender, that the sender has the record of association between the first content and the recipient address;
confirming, by the sender without third-party authentication, that the sender sent the first content to the recipient; and
sending, by the sender, a third message to the recipient address, wherein the third message communicates an acknowledgement confirming that the sender sent the first content to the recipient address.

23. A system for performing sender-authentication of an electronic message received by a recipient, the system comprising:

a processing system comprising one or more processors; and
a memory system comprising one or more computer-readable media, wherein the one or more computer-readable media contain instructions stored thereon that, if executed by the processing system, cause the system to perform operations comprising:

receiving, by the recipient, a first message at a recipient address associated with the recipient, wherein the first message comprises first content and a putative sender address from which the first message purportedly originated;

sending, by the recipient, a second message directly to the putative sender address in response to the first message, wherein the second message comprises:
information reflecting the first content; and
a request for confirmation that a sender associated with the putative sender address sent the first content to the recipient; and determining, by the recipient without third-party authentication, whether the first message is authentic based on whether a third message is received directly from the putative sender address acknowledging or repudiating that the sender sent the first content to the recipient.

* * * * *